United States Patent
Minegishi

(10) Patent No.: US 10,740,053 B2
(45) Date of Patent: Aug. 11, 2020

(54) INFORMATION PROCESSING APPARATUS TO SWITCH A PRINT OUTPUT DESTINATION OF A LOGICAL PRINTER

(71) Applicant: Youichi Minegishi, Kanagawa (JP)

(72) Inventor: Youichi Minegishi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/294,988

(22) Filed: Mar. 7, 2019

(65) Prior Publication Data

US 2019/0286385 A1  Sep. 19, 2019

(30) Foreign Application Priority Data

Mar. 19, 2018 (JP) .................................. 2018-051767

(51) Int. Cl.
*G06F 3/12* (2006.01)

(52) U.S. Cl.
CPC .............. *G06F 3/126* (2013.01); *G06F 3/121* (2013.01); *G06F 3/1236* (2013.01); *G06F 3/1276* (2013.01); *G06F 3/1284* (2013.01)

(58) Field of Classification Search
CPC ...... G06F 3/126; G06F 3/1236; G06F 3/1276; G06F 3/1284; G06F 3/121; G06F 3/1225; G06F 3/1226; G06F 3/1285; G06F 3/1291; G06F 3/1292; G06F 3/1293
See application file for complete search history.

(56) References Cited

U.S. PATENT DOCUMENTS

| | | |
|---|---|---|
| 9,880,792 B2 | 1/2018 | Minegishi |
| 2009/0036056 A1* | 2/2009 | Oshima .............. H04M 1/7253 455/41.3 |
| 2012/0044534 A1* | 2/2012 | Ichikawa .............. G06F 3/1204 358/1.15 |
| 2014/0071474 A1* | 3/2014 | Uchida ................. G06F 3/1204 358/1.13 |
| 2016/0274825 A1 | 9/2016 | Minegishi |
| 2017/0153884 A1 | 6/2017 | Minegishi |
| 2018/0227445 A1 | 8/2018 | Minegishi |

* cited by examiner

*Primary Examiner* — Kent Yip
(74) *Attorney, Agent, or Firm* — Oblon, McClelland, Maier & Neustadt, L.L.P.

(57) ABSTRACT

An information processing apparatus includes processing circuitry and a memory. The processing circuitry obtains device information from a printer. The processing circuitry obtains logical printer information regarding a logical printer, the logical printer being for printing to the printer from the information processing apparatus. The processing circuitry further determines whether to switch a print output destination of the logical printer based on the obtained device information and a compatible model of a printer driver corresponding to the logical printer, the compatible model of printer driver being obtained based on the printer logical printer information. When determining to switch the print output destination corresponding to the logical printer, the processing circuitry switches the print output destination of the logical printer to the printer.

15 Claims, 17 Drawing Sheets

FIG. 12

| | AUTHENTICATION OF PRINTER OFF | AUTHENTICATION OF PRINTER ON |
|---|---|---|
| AUTHENTICATION OF PRINTER DRIVER OFF | IT IS AVAILABLE TO SWITCH THIS PORT OF PRINTER DRIVER | IT IS UNAVAILABLE TO SWITCH THIS PORT OF PRINTER DRIVER |
| AUTHENTICATION OF PRINTER DRIVER ON | IT IS AVAILABLE TO SWITCH THIS PORT OF PRINTER DRIVER | IT IS UNAVAILABLE TO SWITCH THIS PORT OF PRINTER DRIVER |

1201

INFORMATION PROCESSING APPARATUS TO SWITCH A PRINT OUTPUT DESTINATION OF A LOGICAL PRINTER

CROSS-REFERENCE TO RELATED APPLICATIONS

This patent application is based on and claims priority pursuant to 35 U.S.C. § 119(a) to Japanese Patent Application No. 2018-051767, filed on Mar. 19, 2018, in the Japan Patent Office, the entire disclosure of which is incorporated herein by reference.

BACKGROUND

Technical Field

The present disclosure relates to an information processing apparatus, a non-transitory recording medium, and an information processing method.

Description of the Related Art

Smart devices can detect a printer near the smart device, and connect the detected printer for printing.

Japanese Laid-Open Patent Publication No. 2014-211894 discloses a technique that changes the output destination preset in the printer driver based on a printer connected to a network.

SUMMARY

An information processing apparatus includes processing circuitry and a memory. The processing circuitry obtains device information from a printer. The processing circuitry obtains logical printer information regarding a logical printer, the logical printer being for printing to the printer from the information processing apparatus. The processing circuitry determines whether to switch a print output destination of the logical printer based on the obtained device information and a compatible model of a printer driver corresponding to the logical printer, the compatible model of printer driver being obtained based on the obtained printer logical information. When determining to switch the print output destination corresponding to the logical printer, the processing circuitry switches the print output destination of the logical printer to the printer.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 12 is a table illustrating an exemplary relationship of authentication setting between the printer and the printer drivers according to an embodiment of the present disclosure;

Figure 1:
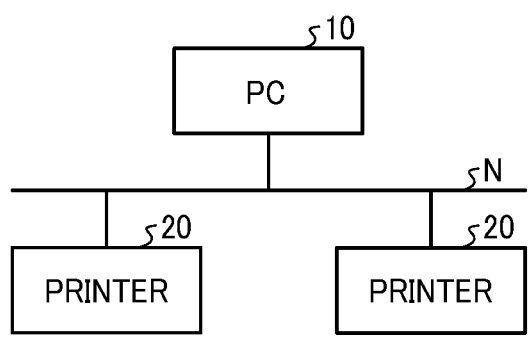
FIG. 1 is a diagram illustrating an exemplary configuration of an information processing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In the following, embodiments of the present disclosure are described with reference to the accompanying drawings.

<Configuration of Information Processing System>

At first, a configuration of an information processing system of this embodiment is described.

FIG. 1 is a diagram illustrating an exemplary configuration of an information processing system according to an embodiment of the present disclosure. As illustrated in FIG. 1, PC (personal computer) 10 as an information processing apparatus and a plurality of printers 20 as devices are connected to network N in the information processing system. A network connection of PC 10 to a printer 20 can be wired or wireless. If the PC 10 is portable, the connection between the PC 10 and the printer 20 is generally wireless. Therefore, the connection is assumed to be wireless in this embodiment. Additionally, the OS of PC 10 is Windows (registered trademark) in this embodiment. The PC 10 is not limited to a laptop computer, but the PC 10 can also be a smart device, a mobile device, a terminal device, an information processing apparatus, or a smart phone. Furthermore, the printer 20 can have only the function of the printer, or can have a plurality of functions such as faxing, scanning, etc. The printer 20 can be also called an image forming apparatus, a multiple-function device, an image-handling apparatus, or an image processing apparatus.

Furthermore, the PC 10 can set one or more printer icons using a same printer driver. For example, the PC 10 can set a first printer icon corresponding to a port for outputting to printer A and a second printer icon corresponding to a port for outputting to printer B. The first printer icon and the second printer icon correspond to the same printer driver. Each of the printer icons corresponds to both a printer driver and a port (connected printer/print output destination). A printer icon is also called a logical printer.

<Hardware Configuration>

(Hardware Configuration of Personal Computer)

Figure 16:
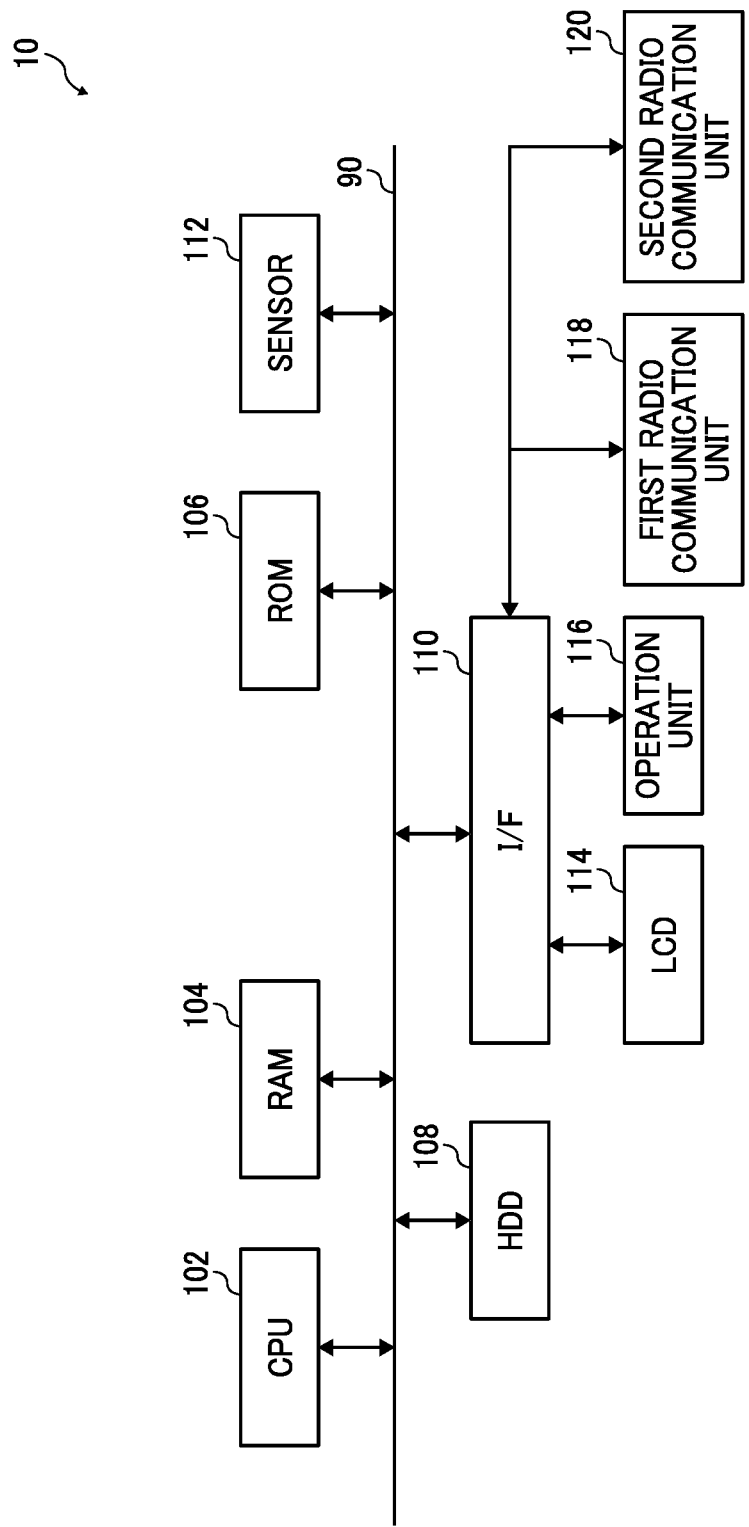
FIG. 16 is a block diagram illustrating an exemplary hardware configuration of a personal computer according to an embodiment of the present disclosure.

FIG. 16 is a diagram showing a hardware configuration of the PC 10 according to one of the embodiments. The PC 10 includes a CPU 102, a RAM 104, a ROM 106, an HDD 108, an I/F 110, a sensor 112, a Liquid Crystal Display (LCD) 114, an operation unit 116, a first radio communication unit 118, and a second radio communication unit 120. Further, the CPU 102, the RAM 104, the ROM 106, the HDD 108, the UP 210, and the sensor 112 are connected via a bus 90.

The CPU 102 controls the whole PC 10. The ROM 106 is a read-only non-volatile storage medium and stores a program such as firmware. The RAM 104 is a volatile storage medium capable of reading and writing information at high speed and is used as a work area when the CPU 102 processes information. The HDD 108 is a non-volatile storage medium capable of reading and writing information and stores an OS, various control programs, application programs, and the like.

The I/F 110 connects the bus 90 to various hardware and networks. The sensor 112 is implemented with hardware such as an acceleration sensor. The LCD 114 is a visual user interface for a user to confirm a status of the PC 10. The operation unit 116 is a user interface, such as a keyboard or a mouse, for the user to input information to the PC 10. The LCD 114 and the operation unit 116 can be constructed with a touch panel and the keyboard can be implemented with software.

The first radio communication unit 118 performs radio communication using a first radio communication method, such as Bluetooth 4.0 or short-range radio communication, at a lower speed compared with a second radio communication method.

The second radio communication unit 120 performs radio communication in accordance with a standard of a second radio communication method, such as a wireless LAN, the radio communication being performed at a higher speed compared with the first radio communication method.

(Hardware Configuration of Printer)

Figure 17:
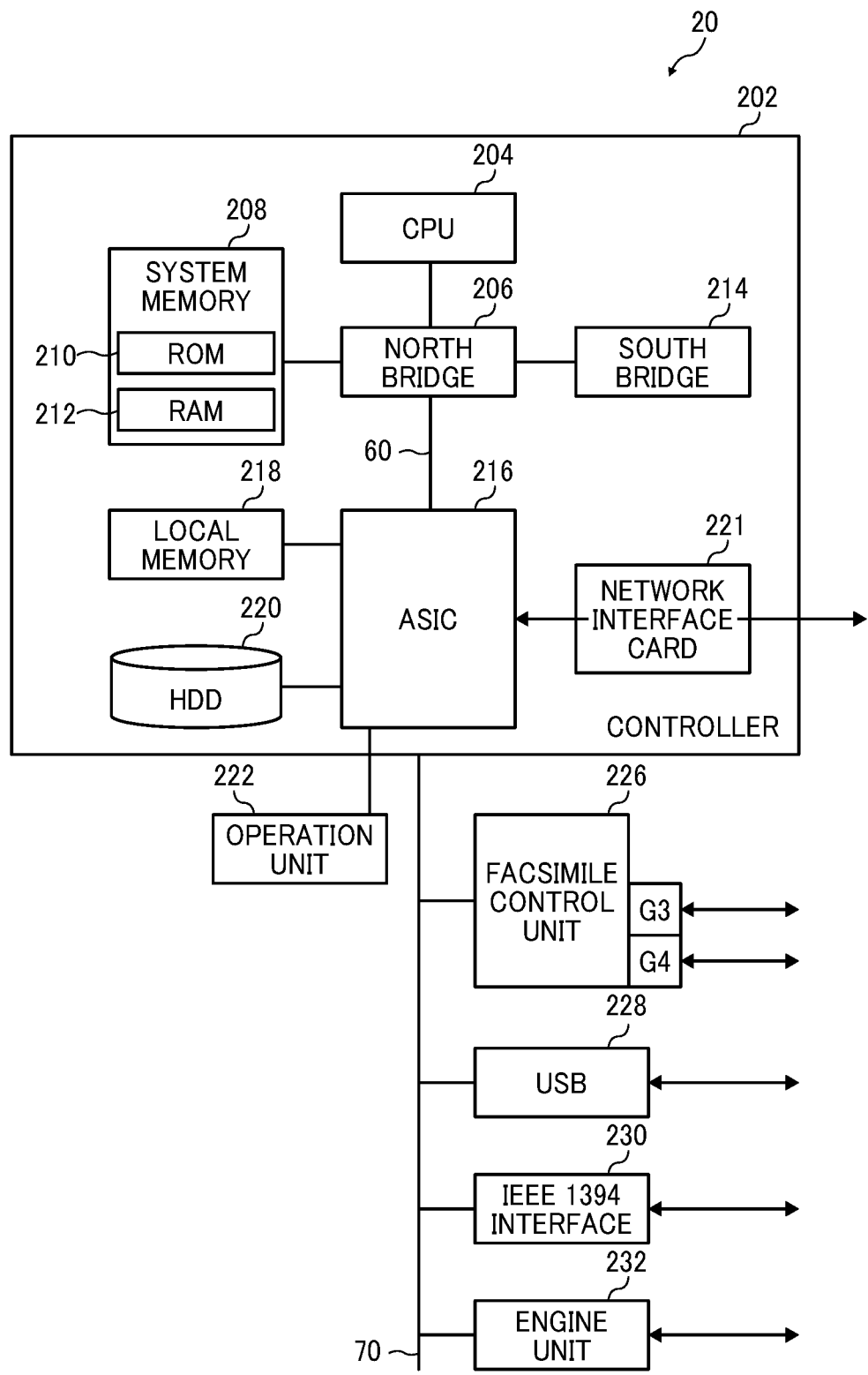
FIG. 17 is a block diagram illustrating an exemplary hardware configuration of a printer according to an embodiment of the present disclosure.

FIG. 17 is a diagram showing a hardware configuration of the image processing device (printer) 20 according to one of the embodiments.

The printer 20 includes a controller 202, an operation unit 222, a Facsimile Control Unit (FCU) 226, a Universal Serial Bus (USB) 228, an Institute of Electrical and Electronic Engineers (IEEE) 1394 interface 230, and an engine unit 232. In the printer 20, elements other than the operation unit 222 can be referred to as a main body unit.

The controller 202 includes a Central Processing Unit (CPU) 204, a north bridge (NB) 206, a system memory (MEM-P) 208, a south bridge (SB) 214, an Application Specific Integrated Circuit (ASIC) 216, a local memory (MEM-C) 218, an HDD 220, and a Network Interface Card (NIC) 221. The system memory 208 includes a Read Only Memory (ROM) 210 and a Random Access Memory (RAM) 212.

The CPU 204 controls the whole printer 20 and constitutes a chipset together with the north bridge 206, the system memory 208, and the south bridge 214. The CPU 204 is connected to another device via this chipset. The north bridge 206 is a bridge connected among the CPU 204, the system memory 208, the south bridge 214, and an Accelerated Graphics Port (AGP) bus 60. The north bridge 206 includes a memory controller for controlling reading or writing on the system memory 208, a Peripheral Component Interface master (PCI) master, and an AGP target.

The AGP bus 60 is an interface provided to speed up a graphic process. The AGP bus 60 speeds up an image process by directly accessing the system memory 208 at high throughput.

The ROM 210 of the system memory 208 is a read-only memory that stores a program or data for an image processing device. The RAM 212 of the system memory 208 is a writable and readable memory, which is used to load the program or data for an image processing device and is also used to when a rendering process is performed by a printer. The south bridge 214 is a bridge connected between the north bridge 206 and a peripheral device such as a PCI device. The south bridge 214 is connected to the north bridge 206 via a PCI bus. It is possible to connect a network interface (I/F) to the PCI bus.

The ASIC 216 is an Integrated Circuit (IC) for image processing having a hardware element for image processing. The ASIC 216 functions as a bridge to connect the AGP bus 60, a PCI bus 70, the HDD 220, and the local memory 218. The ASIC 216 includes a PCI target and an AGP master, an arbiter (ARB) that functions as a core of the ASIC 216, a memory controller that controls the local memory 218, a plurality of Direct Memory Access Controllers (DMACs) that rotate image data using hardware logic, and a PCI unit that transfers data with the engine unit 232 via the PCI bus 70. To the ASIC 216, the operation unit 222, the Facsimile Control Unit 226, the USB 228, the IEEE 1394 interface 230, and the engine unit 232 are connected via the PCI bus 70.

The local memory 218 is used as an image buffer and a code buffer for copying. The HDD 220 stores image data, programs, font data, and forms. The HDD 220 also stores a license of an application executed in the printer 20. The NIC 221 is an interface to connect to a network such as the LAN 50.

The operation unit 222 is directly connected to the ASIC 216 and is an interface for a user such as an operator who operates the printer 20. By operating the operation unit 222, it is possible to input data, execute a job, and display images, for example.

The Facsimile Control Unit 226 is connected to the PCI bus 70 and controls communication with an external device such as a FAX device or a copying device having a modem function in a public line. Each of the USB 228 and the IEEE 1394 interface 230 is connected to the PCI bus 70 to be able to connect to a peripheral device. The engine unit 232 is connected to the PCI bus 70 and can use a printer engine such as a black-and-white plotter, a color plotter with a single drum, a color plotter with four drums, a scanner, a fax unit, or the like. In addition, the engine unit 232 can include an image processing unit for error diffusion or gamma transformation.

(Hardware Configuration of Operation Unit)

Figure 18:
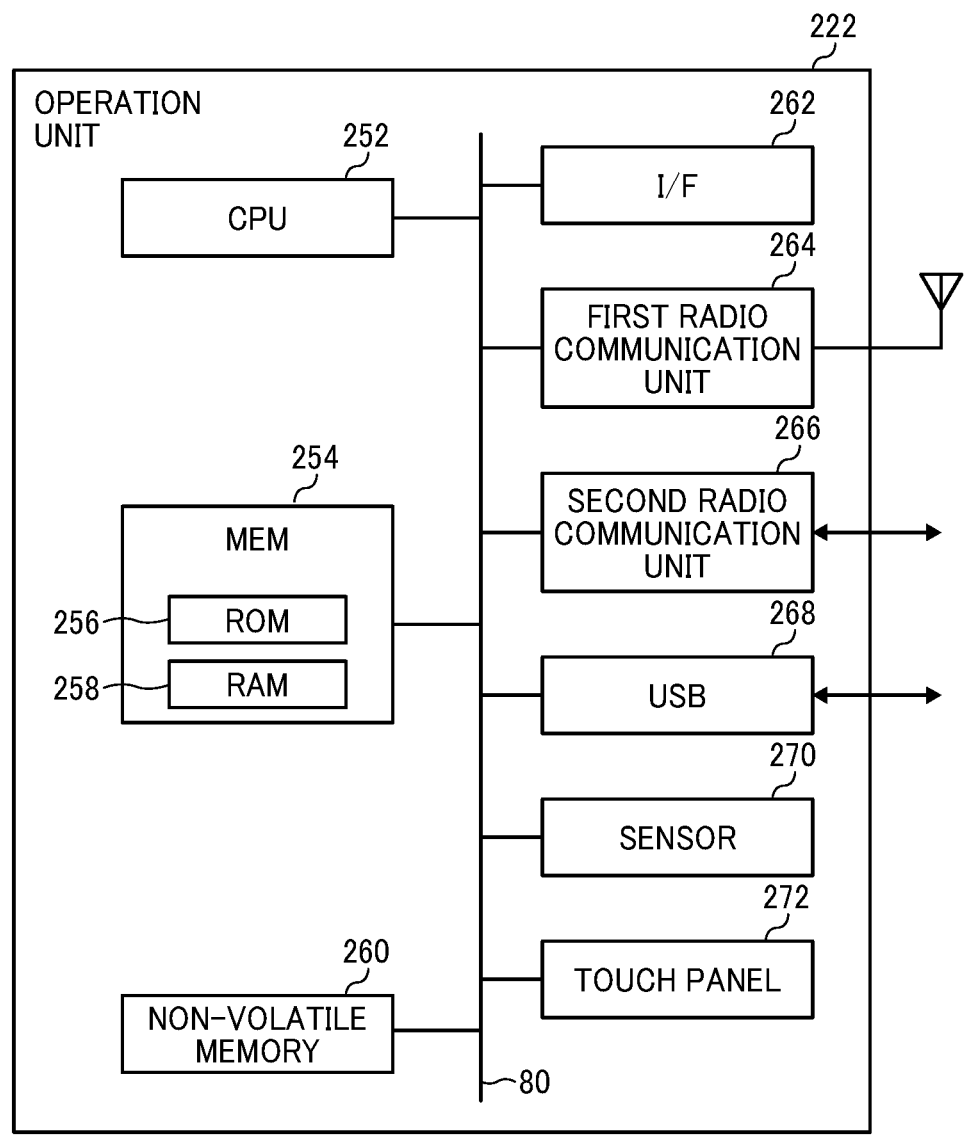
FIG. 18 is a block diagram illustrating an exemplary hardware configuration of an operation unit according to an embodiment of the present disclosure.

FIG. 18 is a diagram showing a hardware configuration of the operation unit 222 of the printer 20 according to the embodiments. The operation unit 222 may use a typical information processing terminal and includes a CPU 252, a memory 254, a non-volatile memory 260, an I/F 262, a first radio communication unit 264, a second radio communication unit 266, a USB 268, a sensor 270, and a touch panel 272. The CPU 252, the memory 254, the non-volatile memory 260, the I/F 262, the first radio communication unit 264, the second radio communication unit 266, the USB 268, the sensor 270, and the touch panel 272 are connected via a bus 80.

The CPU 252 controls the whole operation of the operation unit 222. The memory 254 includes a ROM 256 and a RAM 258. The ROM 256 is a read-only non-volatile storage medium and stores a program such as firmware. The RAM 258 is a volatile storage medium configured to read and write information at high speed and is used as a work area when the CPU 252 processes information.

The non-volatile memory 160 is a non-volatile storage medium of NAND type or the like and configured to read and write information and store an Operating System (OS), various control programs, application programs, and the like. The I/F 262 connects between the bus 80, various hardware, and a network such as the LAN 50.

The first radio communication unit 264 performs radio communication in a first radio communication method, such as Bluetooth (registered trademark) 4.0, Bluetooth Low Energy (BLE), or short-range radio communication (Near Field Communication (NFC)), at lower speed compared with a second radio communication method.

The second radio communication unit 266 is connected to a wireless access point via a LAN. The second radio communication unit 266 performs a process for radio communication in accordance with a standard of the second radio communication method such as a wireless LAN via the wireless access point, the radio communication being performed at higher speed compared with the first radio communication method.

The USB 268 can connect a peripheral device. The sensor 270 is implemented with hardware such as an acceleration sensor. The touch panel 272 is a visual user interface for a user to confirm a status of the printer 20. The touch panel 272 is also used when an operation is performed.

It is possible to connect between the operation unit 222 and the ASIC 216 via the I/F 262 or the USB 268.

Further, the first radio communication unit 264 and the second radio communication unit 266 can be included in the main body unit instead of the operation unit 222 or can be included in both the operation unit 222 and the main body unit.

<Functional Configuration of Information Processing System>

Figure 2:
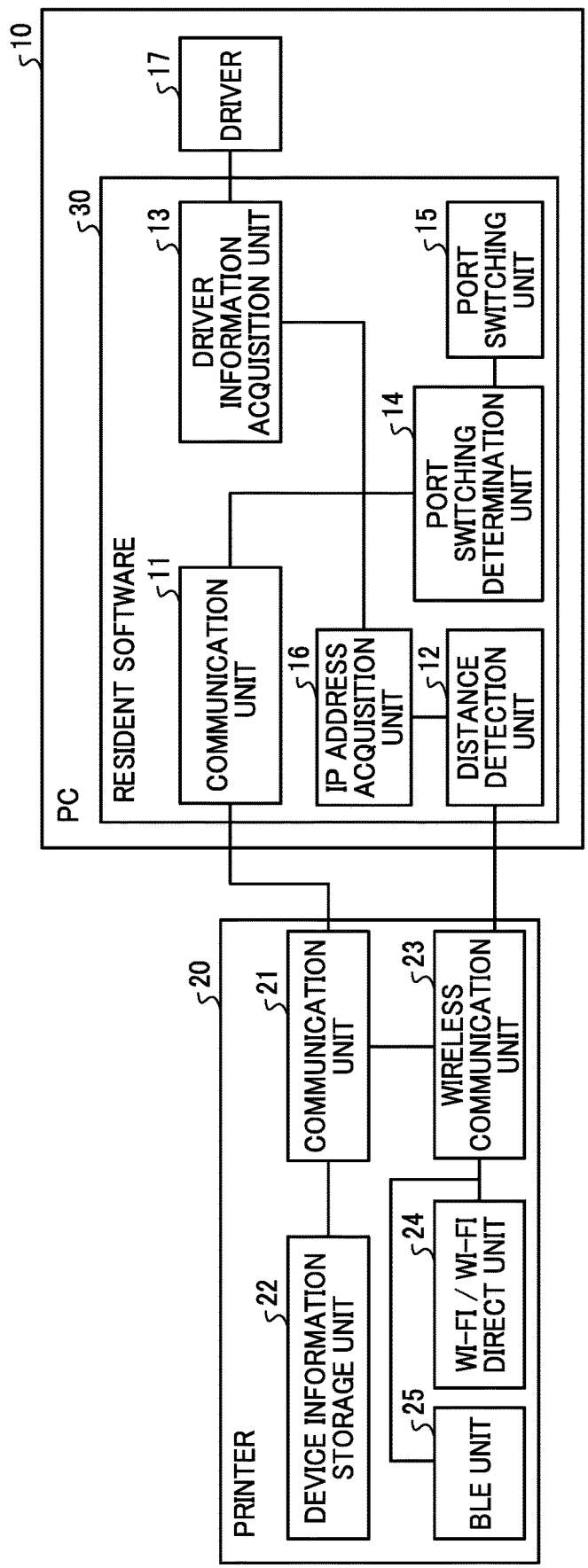
FIG. 2 is a brock diagram an exemplary functional configuration of the information processing system according to an embodiment of the present disclosure.

FIG. 2 is a block diagram of an exemplary functional configuration of the information processing system according to an embodiment of the present disclosure. In FIG. 2, the printer 20 includes a communication unit 21, a device information storage unit 22, a wireless communication unit 23, a Wi-Fi/Wi-Fi Direct unit 24, and a BLE unit 25. These functions of the printer 20 are functions that are implemented by operating one or more hardware elements illustrated in FIG. 16 and FIG. 17. These functions of the printer 20 are functions that are implemented in cooperation with instructions of the CPU 204 according to the program expanded from the HDD 220 to the RAM 212, or instruction of the CPU 252 according to the program expanded from the ROM 256 to the RAM 258.

The communication unit 21 transmits and receives various kinds of information via a network. The communication unit 21 is implemented by the CPU 204 of FIG. 16 executing the program to control the first radio communication unit 264 and the second radio communication unit 266 of FIG. 17. The device storage unit 22 stores PnP (Plug and Play) name information, device identification information, and a brand name as device information. Furthermore, the device storage unit 22 transfers the device information in response to a request from an external device. The communication unit 23 manages information transmitted by BLE or Wi-Fi Direct. The Wi-Fi/Wi-Fi Direct unit 24 has a host function of Wi-Fi Direct. Because the Wi-Fi/Wi-Fi Direct unit 24 has a host function, the PC 10 can connect to the printer 20 directly. The BLE unit 25 manages radio waves of BLE. The BLE unit 25 emits radio waves with a strength based on a format of the BLE. The communication unit 23 is implemented by the CPU 204 of FIG. 16 executing the program or the CPU 252 of FIG. 17 executing the program to control the first radio communication unit 264 of FIG. 17 and the second radio communication unit 266 of FIG. 17. The Wi-Fi/Wi-Fi Direct unit 24 is implemented by the CPU 204 of FIG. 16 executing the program or CPU 252 of FIG. 17 executing the program to control the second radio communication unit 266 of FIG. 17. The BLE unit 25 is implemented by the CPU 204 of FIG. 16 executing the program or CPU 252 of FIG. 17 executing the program to control the first radio communication unit 264 of FIG. 17.

The PC 10 includes a communication unit 11, a distance detection unit 12, a driver information acquisition unit 13, a port switching determination unit 14, a port switching unit 15 (output destination changing unit), an IP address acquisition unit 16, and one or more drivers 17. These functions of the registration terminal 50 are functions that are implemented by operating one or more hardware elements illustrated in FIG. 5 in cooperation with instructions of the CPU 102 according to the program expanded from the HDD 108 to the RAM 104. The program can be distributed from a server for program distribution. Alternatively, the program can be distributed on a storage medium.

The communication unit 11 transmits and receives various kinds of information via a network. The communication unit 11 is implemented by the CPU 102 of FIG. 16 executing the program to control the first radio communication unit 118 and the second radio communication unit 120. The distance detection unit 12 acquires the radio wavelength of Bluetooth (registered trademark) emitted from the BLE unit 25 of the printer 20. The distance detection unit 12 measures a distance between the PC 10 and the printer 20 based on the radio wavelength of Bluetooth emitted from the BLE unit 25 of the printer 20. A driver information acquisition unit 13 acquires one or more driver names of the drivers 17 installed on the PC 10, one or more PnP names corresponding to the drivers 17, and setting information of drivers 17. The port switching determination unit 14 determines whether the port switching unit 15 should switch a port corresponding the drivers 17 or not, based on information of printer 20 and information of the drivers 17. The port switching unit 15 switches the port when the port switching determination unit 14 determines that the port switching unit 15 should switch the port. A printer icon that is switched is changed to a default printer icon. When a printer icon is set to a default printer icon and an application used by a user of the PC 10 receives an input of a printing instruction, the application selects the printer icon set to the default printer icon first. When the user does not change the printer icon, the PC 10 prints by using the printer icon set to the default printer icon.

<IP address acquisition process>

Figure 3:
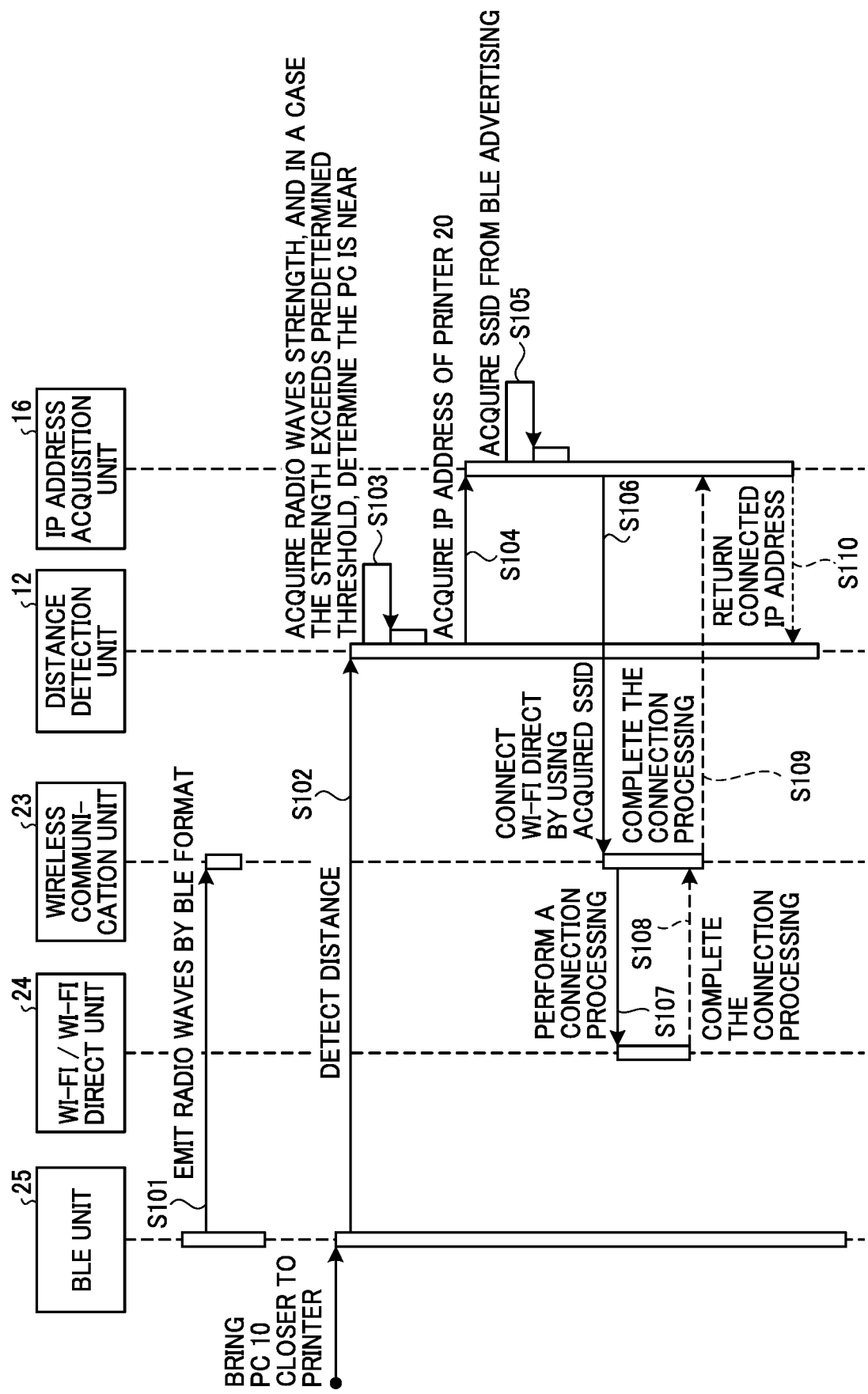
FIG. 3 is a sequence diagram illustrating an exemplary IP address acquisition process for acquiring an IP address of a printer according to an embodiment of the present disclosure.

FIG. 3 is a sequence diagram illustrating an exemplary IP address acquisition process for acquiring an IP address (connection information) of a printer according to an embodiment of the present disclosure. In FIG. 3, the BLE unit 25 emits information repeatedly by using BLE advertising (S101). The BLE unit 25 transmits an SSID key of Wi-Fi Direct included in the printer 20. The distance detection unit 12 acquires a radio wavelength (RSSI) that is part of the BLE information, and detects a distance between the PC 10 and the printer 20 based on the acquired radio wavelength (S102). The distance detection unit 12 determines that the printer 20 is near when the detected radio wavelength exceeds a certain threshold value (S103).

The IP address acquisition unit 16 starts a process to acquire the IP address of the printer 20 (S104). The IP address acquisition unit 16 acquires a SSID key emitted by using BLE advertising from the BLE unit 25 of the printer 20. The PC performs a connection process to connect to Wi-Fi Direct, which is indicated by the acquired SSID key (S106, S107). Furthermore, the Wi-Fi Direct unit 24 performs a connection completion process of Wi-Fi Direct (S108, S109). The IP address acquisition unit 16 returns the connected IP address (S110).

Specifically, the distance detection unit 12 uses the BluetoothEAadvertisementwatcher class of Windows. For example, the InRangeThreshoholdinDBm and the OutOfRangeThreshoholdDBm of the BluetoothEAadvertisementwatcher class is set to a radio wavelength as −60 and −65. If the radio wavelength is within a certain threshold range, the distance detection unit 12 determines that the printer 20 is near to the PC 10. Then, a method stored in Received of the BluetoothEAadvertisementwatcher class is called in response to calling from the OS. Since a parameter of the called method includes SSID information, contained in the BLE advertising, the PC 10 acquires the SSID information and connects to Wi-Fi Direct by using the WiFIDirectDevice class.

<Port switching process>

Figure 4:
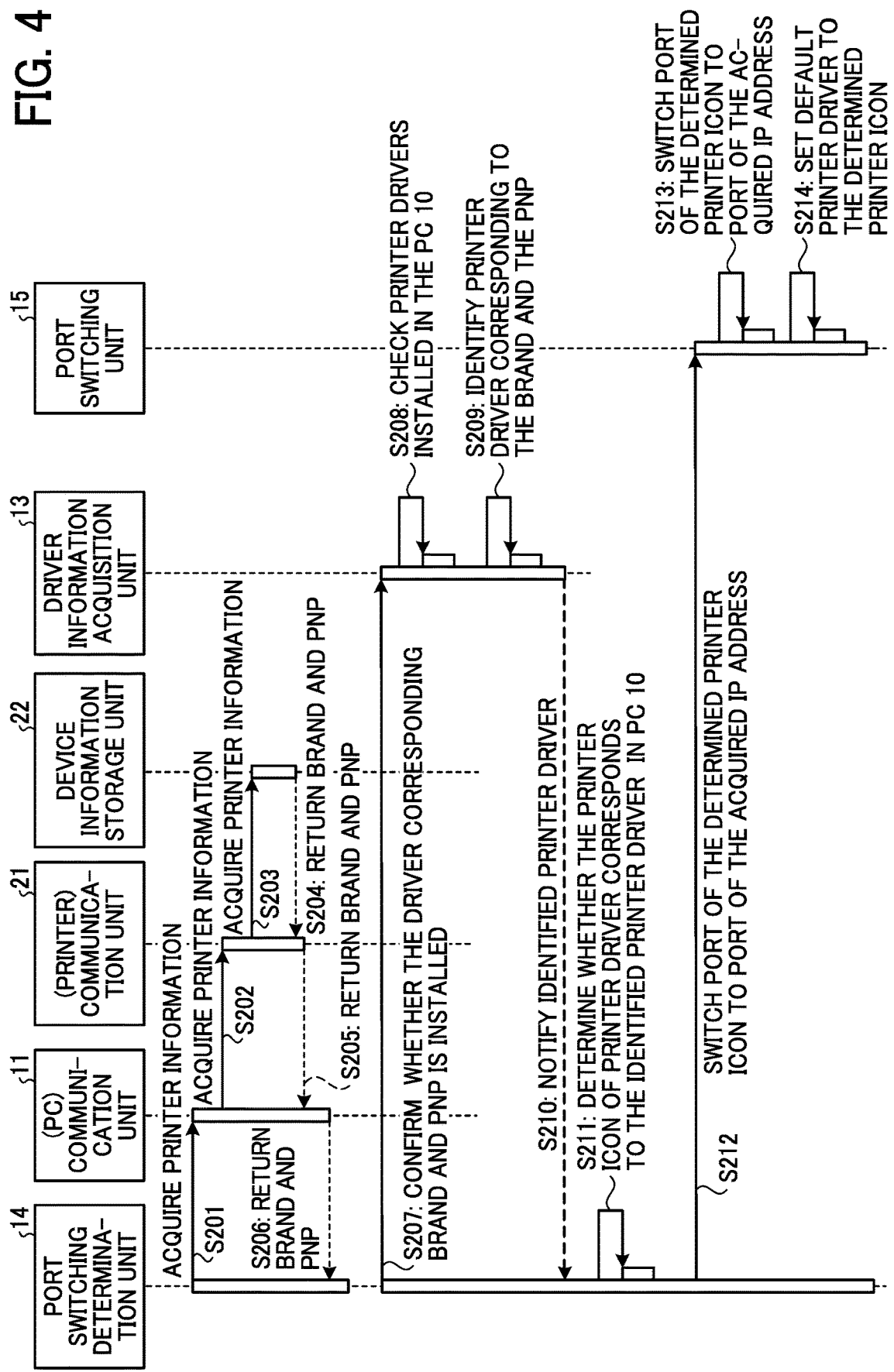
FIG. 4 is a sequence diagram illustrating an exemplary port switching process after acquiring the IP address of the printer according to an embodiment of the present disclosure.

FIG. 4 is a sequence diagram illustrating an exemplary port switching process after acquiring the IP address of the printer according to one embodiment of the present disclosure. In FIG. 4, when the IP address of the printer 20 is acquired, the port switching unit 15 acquires a brand name and a PnP name of the printer 20 from the information storage unit 22 by using the SMNP protocol (S201~S206). Specifically, for example, the brand name of the printer 20 is "RICOH." Furthermore, the PnP name of the printer 20 is "MP C001."

Then, the port switching unit 15 determines whether the driver corresponding to the acquired brand name and the PnP name is installed PC 10 (S207). Thereby, the driver information acquisition unit 13 lists drivers installed in PC 10 (S208). Specifically, the information acquisition unit 13 lists the drivers by calling EnumPrinters( ) and acquiring the structure PRINTER_INFO_2 including printer icon information. The structure PRINTER_INFO_2 includes printer icon information. Specifically, the structure PRINTER_INFO_2 includes a printer icon name, a port name, owners in common of the printer icon, and a comment setting, etc. that corresponds to a printer icon.

Then, the driver information acquisition unit 13 identifies the driver corresponding to the brand name and the PnP name (S209). Regarding the brand, the driver information acquisition unit 13 confirms whether there is a match between the brand name of the printer 20 and the brand name of a driver installed in PC 10. Specifically, since the structure PRINTER_INFO_2 includes pPrinterName, which is a printer icon name, the driver information acquisition unit 13 acquires a printer handle based on the printer icon name. The driver information acquisition unit 13 acquires DRIVER_INFO_8 by calling GetPrinterDriver based on the printer handle. The structure DRIVER_INFO_8 is data including driver information. Specifically, the structure DRIVER_INFO_8 includes a driver name, an installation path of the driver, path of help file, and path of color profile etc. The DRIVER_INFO_8 also includes a value of pszMfgName that stores brand information described in inf. The driver information acquisition unit compares the stored brand name and the brand name acquired from printer 20, and determines whether the stored brand name and the brand name acquired from printer 20 are the same. The port switching determination unit 14 receives the compared result (S210).

On the other hand, the registry of the windows also includes the brand name of the driver installed in the PC 10. When a key value called Manufacture of HKLM/SYSTEM/CurrentControlSet/Control/Print/Printer/<icon name>/PnPData is read, a brand name corresponding to the icon name is acquired.

As one method of acquiring the PnP, the driver information acquisition unit 13 acquires the file path from pDriverPathh of the structure DRIVER_INFO_8, and acquires one or more inf files from the file path. The inf file is a setting file of one of the drivers. The driver information acquisition unit 13 compares whether there is a match with the PnP acquired from the printer in the inf files. The driver information acquisition unit 13 notifies the compared result (S210).

In the above description, the inf file is used as an example. The PC 10 also can have a setting file including the supported models that is different from the inf file. As an advantage of the setting file, when you don't want the system to support Plug & Play, but you want the system to support the switching function, you can realize that by using the setting file.

Upon receiving the compared result of the driver corresponding to the brand and the PnP, the port switching determination unit 14 determines whether the PC 10 has the driver corresponding to the brand and the PnP (S211). If PC 10 has the driver corresponding to the brand and the PnP, the port switching determination unit 14 requests the port switching unit 15 to switch the port associated with the driver corresponding to the brand and the PnP, to a port of the IP address acquired from the printer 20 (S212). If the PC 10 does not have the driver corresponding to the brand and the PnP, the process is finished.

Furthermore, if the driver information acquisition unit 13 does not identify the driver corresponding to the brand name and the PnP name in S209, the driver information acquisition unit 13 does not have to perform notification. In this case, the identification process of the driver corresponding to the PnP is not necessary. The determination process of the port switching determination unit 14 is also necessary. Therefore, this process can be finished.

Next, the port switching unit 15 switches the port associated with the driver corresponding to the brand and the PnP, to the port of the IP address acquired by the printer 20 (S213). The port switching unit 15 switches the port of the IP address and creates the port by using the API of the OS. Furthermore, the port switching unit 15 sets the default printer icon to the printer icon associated with the switched port (S214).

When the Window WMI object is used, the object is created by calling ManagementClass by using CreateInstance() of Win32_TCPPrinterPort in order to specify a program to create the TCP/IP port.

The above-described embodiments are illustrative and do not limit the present disclosure. Thus, numerous additional modifications and variations are possible in light of the above teachings. For example, elements and/or features of different illustrative embodiments can be combined with each other and/or substituted for each other within the scope of the present disclosure. For example, in order to switch to the created port, the PC 10 sets HostAddress to the IP address of the printer 20 and purNumber to 9100, and calls Put( ) This process is an example. The PC 10 also can switch the port by using XcvData( )function.

After that, the port switching unit 15 changes the default printer as the selected printer (S214). Specifically, the port switching unit 15 sets the printer icon of the driver that the PnP acquired in S209 to the default printer by using the SetPrinter function of Windows.

As described above, according to the present embodiment, when the printer icon of the printer to be output does not exist in the information processing apparatus such as the PC 10, since the PC 10 determines whether the combination of the printer and the printer driver is appropriate in advance, it is possible to prevent unnecessary printing for the user of the information processing apparatus.

Specifically, if the printer driver corresponded to the printer icon set as a default printer icon (printer icon selected currently from a plurality of printer icons in the PC), is not compatible with the destination printer, even if the destination of the printer icon is changed to the destination of the destination printer, the PC might not be able to print, or the printing result might be not desired for the user. Therefore, the present embodiment solves such a problem. Furthermore, when the printer driver corresponding to the destination printer does not exist in the PC, it is possible to prevent wasteful printing that a user does not desire.

(First Variation)

The first variation differs from the previous embodiment in the IP-address-obtaining process of the printer. In the first variation, the PC 10 accesses the printer 20 by using Bluetooth (registered trademark), the printer 20 accesses the PC 10 via the network, and the PC 10 acquires the IP address of the printer 20 by analyzing the access from the printer 20. The other processes are the same as in the previous embodiment.

Figure 5:
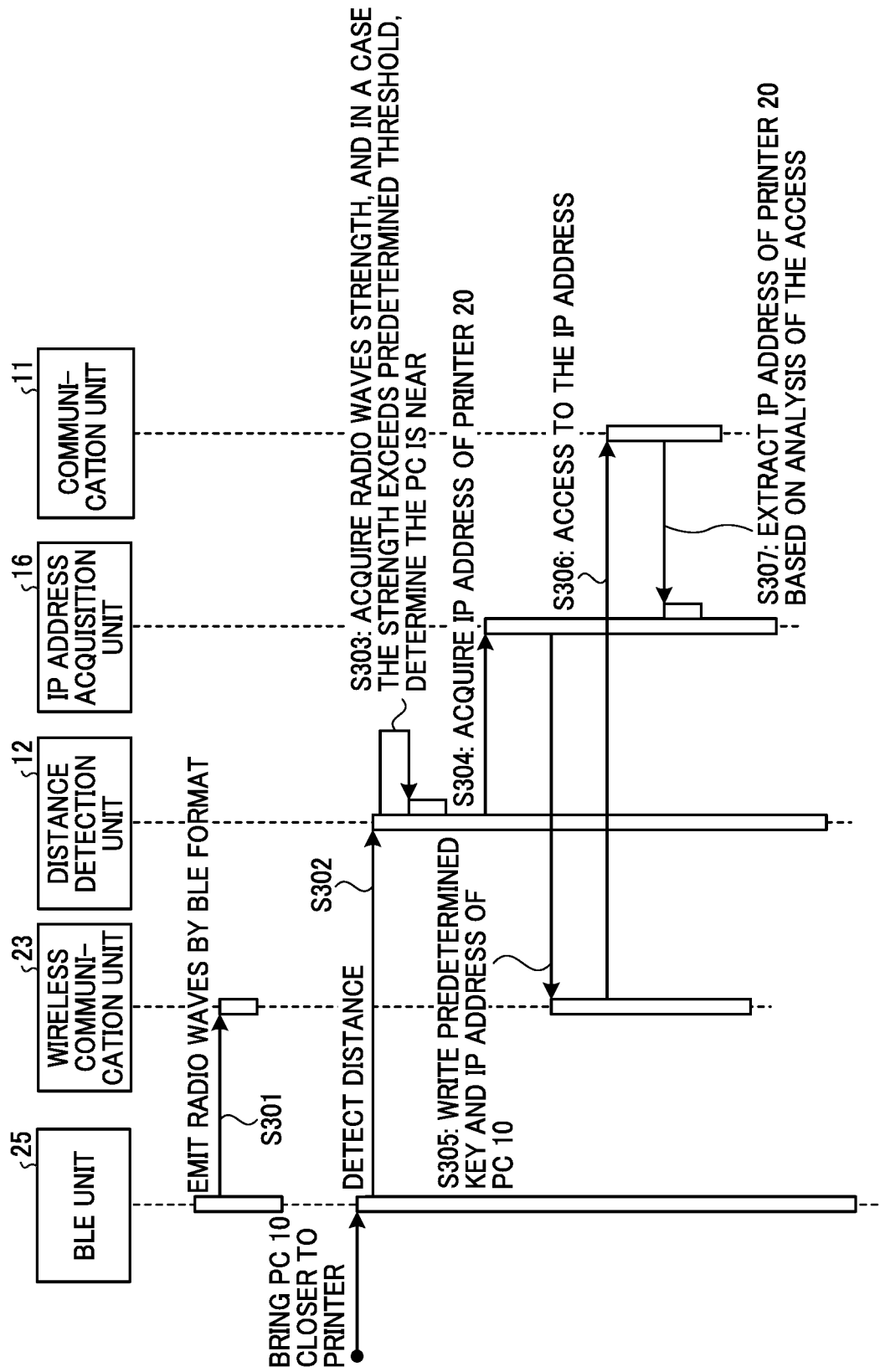
FIG. 5 is a sequence diagram illustrating an exemplary IP address acquisition process for acquiring an IP address of the printer according to a first variation of the present disclosure.

FIG. 5 is a sequence diagram illustrating an exemplary IP address acquisition process for acquiring an IP address of the printer according to a first variation of the present disclosure. In FIG. 5, the BLE unit 25 emits radio waves repeatedly to its surroundings by using BLE advertising (S301).

When the PC 10 approaches the printer 20, the distance detection unit 12 receives the BLE information by using the BluetoothLEAdvertisementWatcher class of Windows (S302). The distance detection unit 12 determines that the PC 10 approaches the printer 20 when the strength (RSSI) of the radio waves exceeds the predetermined threshold (S303). For example, InRangeThresholdInDBm of BluetoothLEAdvertisementWatcher class is set to −60, and OutOfRangeThresholdInDBm of the BluetoothLEAdvertisementWatcher class is set −65. If the strength of the received radio wave falls with the set value range, the distance detection unit 12 determines that the PC 10 approaches the printer 20. Then, the PC 10 calls the method Received of BluetoothLEAdvertisementWatcher class.

Thereafter, the distance detection unit 12 requests the IP address acquisition unit 16 to acquire the IP address of the printer 20 (S304).

The IP address acquisition unit 16 transmits the predetermined key and the IP address of the PC 10 to the printer 20 via Bluetooth (registered trademark) (S305).

The IP address acquisition unit 16 obtains the target BLE device by using the method of DeviceInformation.FindAllAsync. The IP address acquisition unit 16 obtains the service of GATT by using the method of GattDeviceService.FromIdAsync. The IP address acquisition unit 16 obtains GattCharacteristic by using the method of GetCharacteristics of the obtained service. The IP address acquisition unit 16 enables notification by using the method of WriteClientCharacteristicConfigurationDescriptorAsync after setting the CalueChanged event handler. When the IP address acquisition unit 16 sends data by the method of WriteValueAsync, the IP address acquisition unit 16 can obtain the result by calling the event handler.

Thereafter, when the wireless communication unit 23 of the printer 20 receives the predetermined key and the IP address of the PC 10 via BLE, the wireless communication unit 23 accesses the PC 10 by using the IP address (S306).

Furthermore, the IP address acquisition unit 16 analyzes the access from the printer 20, analyzes the IP address of the connection source of the access, and recognizes the analysis result as the IP address of the printer 20 (S307).

As described above, the IP address of the printer 20 is obtained. The port switching process is the same as in the previous embodiment.

(Second Variation)

The second variation differs from the previous embodiment in the IP-address-obtaining process of the printer. In the second variation, the printer 20 emits the IP address by using BLE advertising. The other processes are the same as in the previous embodiment.

Figure 6:
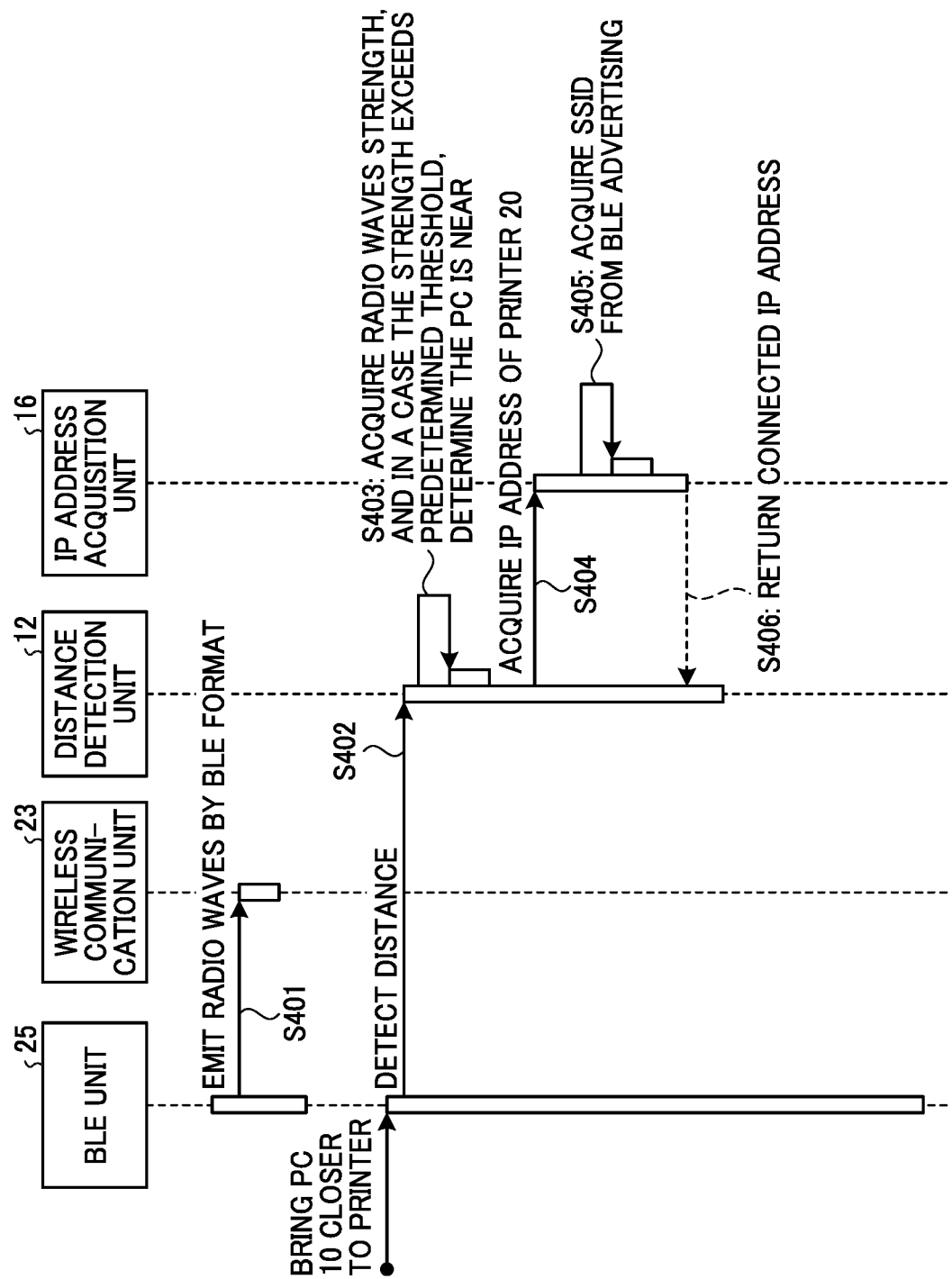
FIG. 6 is a sequence diagram illustrating an exemplary IP address acquisition process for acquiring an IP address of the printer according to a second variation of the present disclosure.

FIG. 6 is a sequence diagram illustrating an exemplary IP address acquisition process for acquiring an IP address of the printer according to a second variation of the present disclosure. In FIG. 6, the printer 20 emits the IP address of the printer 20 by using BLE advertising (S401).

Thereafter, as in the previous variation, the distance detection unit 12 measures the distance from the printer 20 (S402), when the PC 10 approaches the printer 20 (S403), the distance detection unit 12 acquires the IP address emitted from the printer 20 by using the method stored in Received of BluetoothLEAdvertisementWatcher class (S404). Furthermore, IP address acquisition unit 16 acquires the SSID emitted by the BLE advertising from the printer 20 (S405), and returns the connected IP address to the printer 20(S406).

In the first variation, the printer 20 must have a wireless LAN. However, in this second variation, when the printer 20 has only a wired LAN, the PC 10 can acquire the IP address of the printer 20.

In addition, since the printer 20 repeatedly emits the IP address by using BLE advertising, everyone can acquire the IP address. Thus, is necessary to encrypt the information emitted by BLE advertising so that the IP address is not acquired easily.

(Third Variation)

Figure 7:
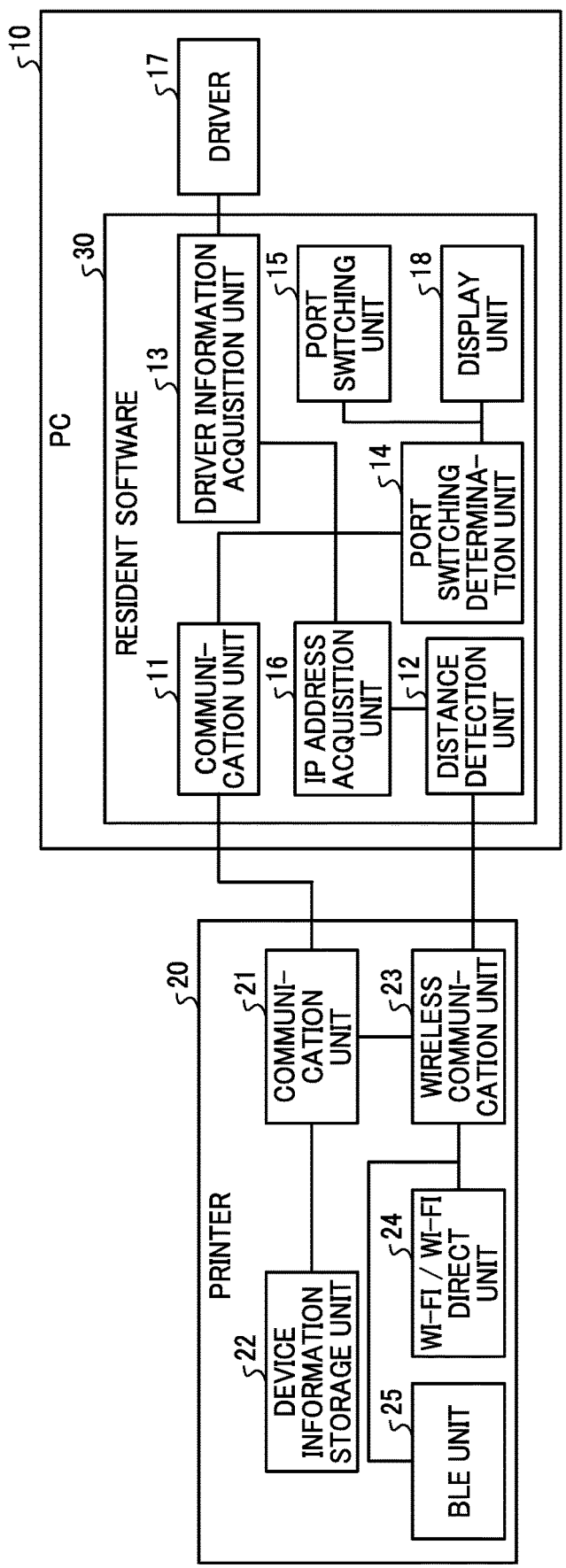
FIG. 7 illustrates an exemplary graphical user interface screen for confirming with a user before switching port according to an embodiment of the present disclosure.

As illustrated in FIG. 7, in the third variation, the display unit 18 is added to the PC 10 in the previous embodiment. The display unit 18 displays a GUI (graphical user interface). The other processes are the same as in the previous embodiment.

In the third variation, the PC 10 displays the user interface before the port switching process and switches the port after the PC 10 receives an input of acceptance from a user.

Figure 8:
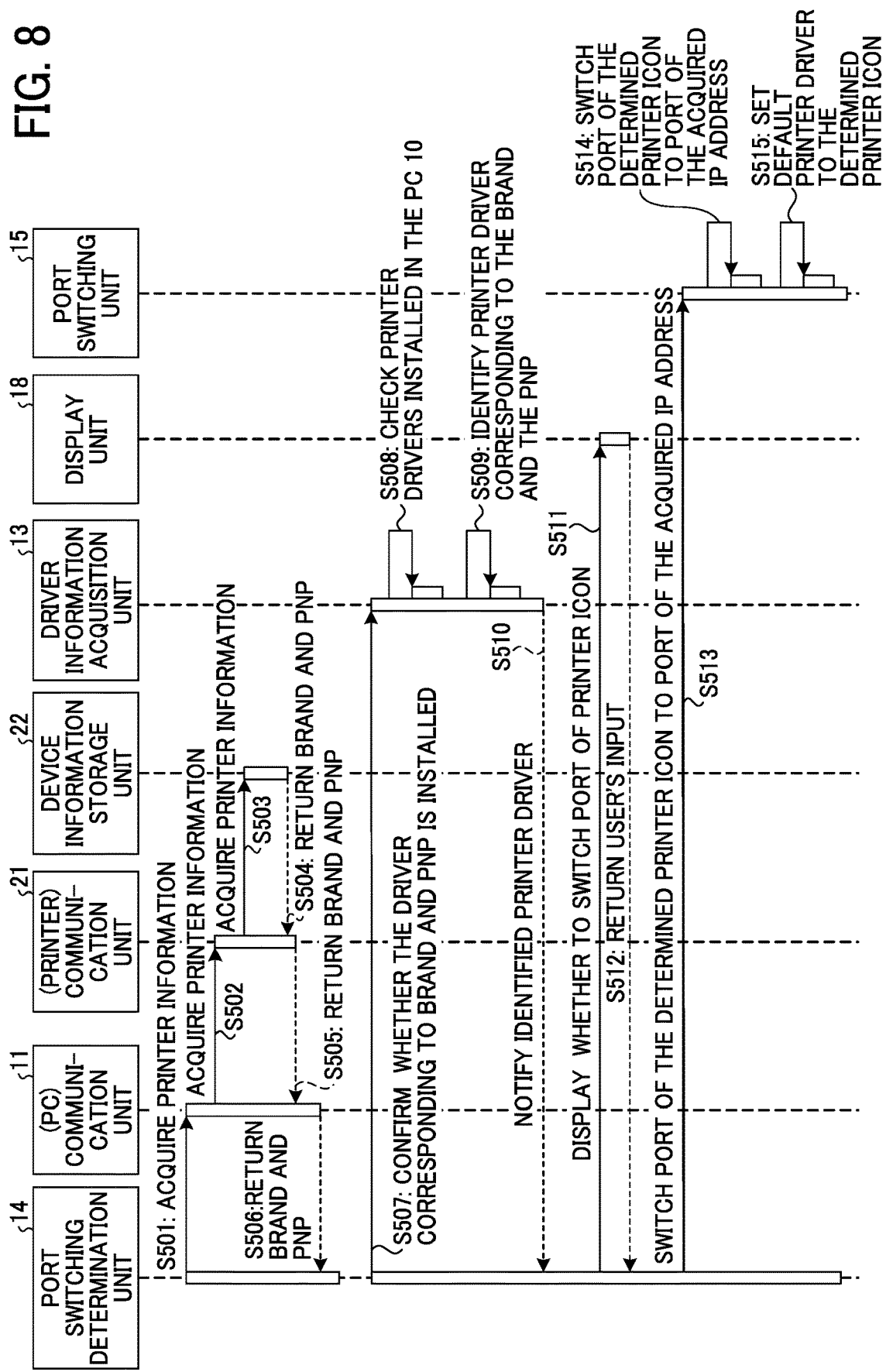
FIG. 8 is a sequence diagram illustrating an exemplary IP address acquisition process including port switching confirmation process according to a third variation of the present disclosure.

FIG. 8 is a sequence diagram illustrating an exemplary IP-address-acquisition process including a port switching confirmation process according to a third variation of the present disclosure. The process of steps S501 to S510 and S513 to S515 in FIG. 5 correspond to the process of steps S201 to S210 and S212 to S214 in FIG. 4.

In FIG. 8, when the port switching determination unit 14 receives notification of the identified printer driver in step S510, the port switching determination unit 14 requests the display unit 18 to display a message asking whether to switch the port. The display unit displays the screen including the message (S511). Thereafter, the port switching determination unit 14 receives a user input to the screen from the display unit 18 (S512), and sends instructions to switch the port based on the user input (S513).

Figure 9:
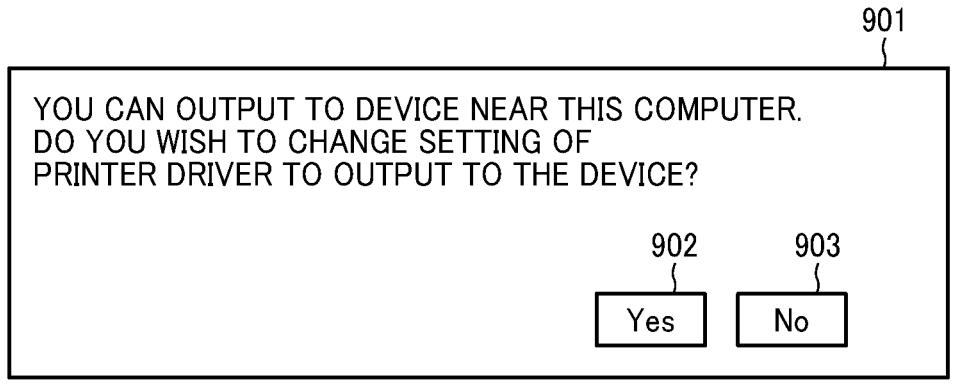
FIG. 9 illustrates an exemplary graphical user interface screen for confirming with a user whether to switch a port according to an embodiment of the present disclosure.

FIG. 9 illustrates an exemplary graphical user interface screen for confirming with a user whether to switch a port according to an embodiment of the present invention. In FIG. 9, the display unit 18 displays a screen including a message "You can output to device near this computer. Do you wish to change setting of printer driver to output the device?". If the display unit 18 receives an input indicating "Yes", the port switching unit 15 switches the port. If the display unit 18 receives an input indicating "No", the port switching unit 15 does not switch the port.

In addition, in FIG. 9, the display unit 18 displays a screen including only one printer icon. However, the screen can include a plurality of printer icons corresponding to a same driver, and the universal driver. The universal driver corresponds to multiple models. In this case, the display unit also provides a plurality of options in the screen.

Figure 10:
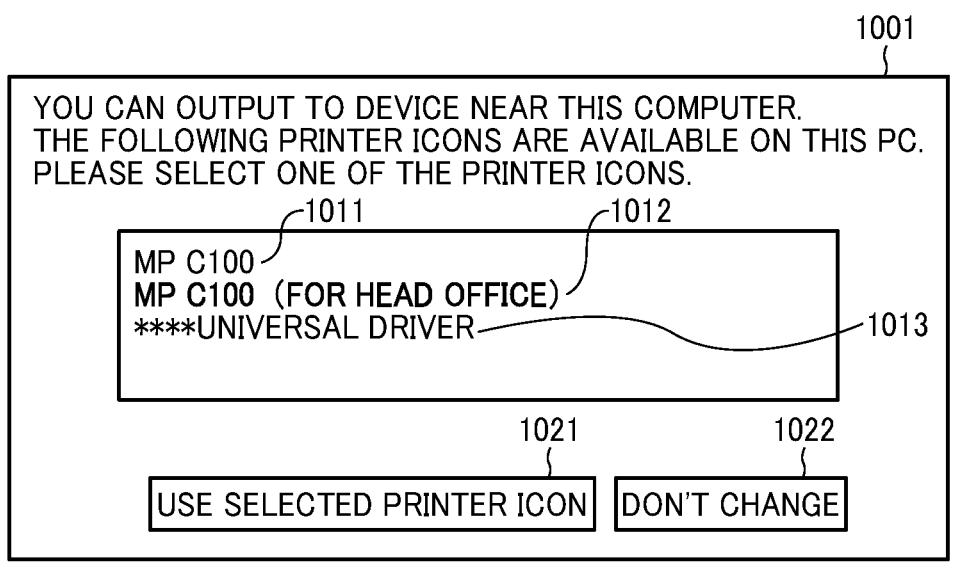
FIG. 10 illustrates an exemplary graphical user interface screen for confirming with a user whether to switch a port according to an embodiment of the present disclosure when there is a plurality of candidate printer drivers.

In FIG. 10, when a plurality of printer icons is notified as candidates, the display unit 18 displays the GUI of FIG. 10 to receive the selection by a user. In FIG. 10, three driver icons are displayed, and after the display unit 18 receives selection of a printer icon and input to the button of "use selected printer icon," the port switching unit 15 switches the selected port.

(Fourth Variation)

In the fourth variation, when the printer 20 is set to the authentication setting, the PC 10 determines whether the driver is set to the authentication setting.

In the previous embodiment and variations, any device approaching the printer 20 can print. For example, when a guest comes to an office, the guest's device also can print by using the printer 20. Even though the printing by the guest is unauthorized printing, the host has to pay a charge for the printing. Therefore, by enabling the authentication function of the printer 20, only authorized users can print.

In this case, if the driver has not enabled the authentication function, the PC 10 cannot print, even if the output destination is switched. Therefore, the PC 10 confirms whether the authentication function of a driver is enabled before switching the output destination.

Figure 11:
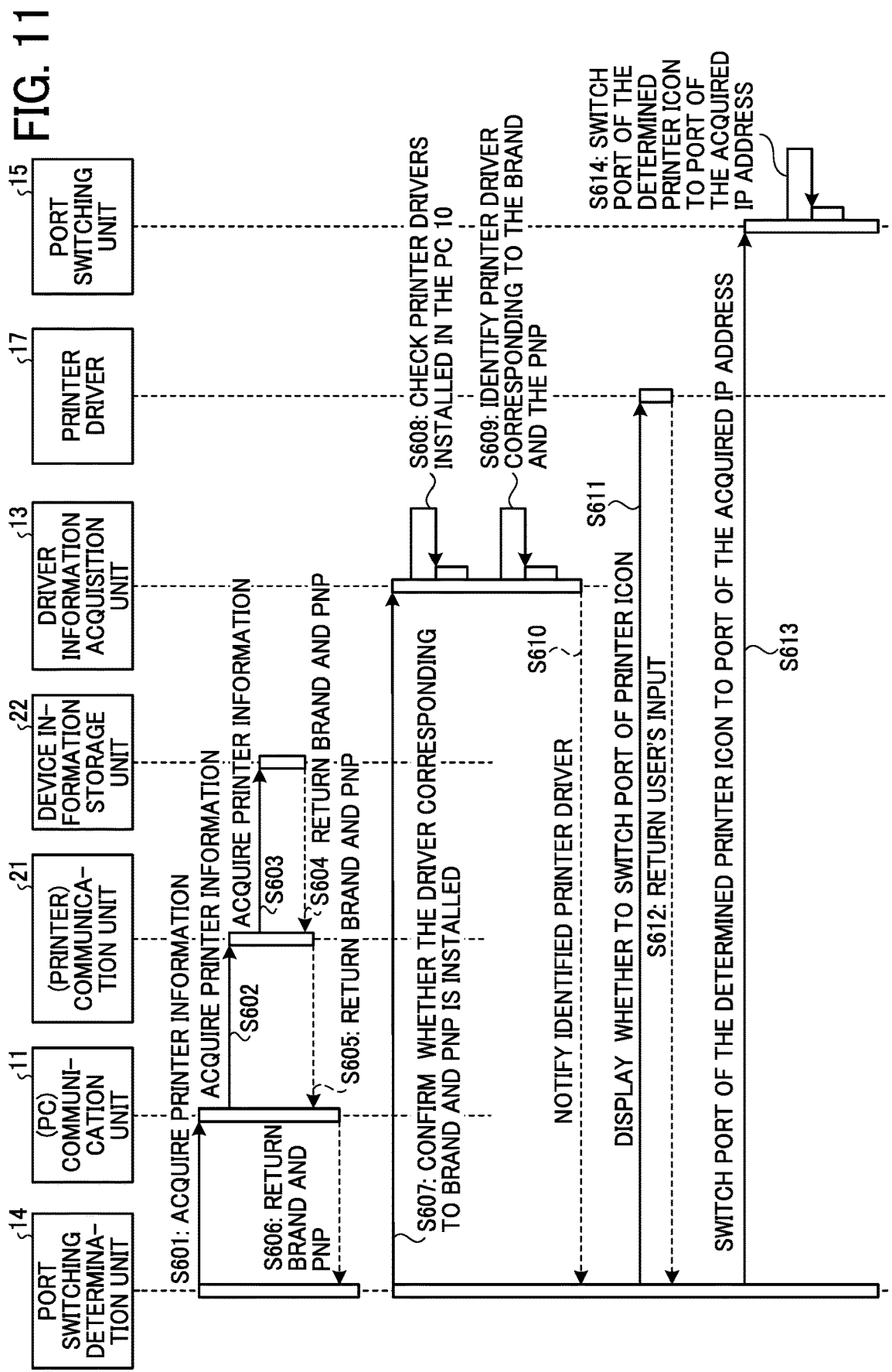
FIG. 11 is a sequence diagram illustrating an exemplary port switching process including a confirmation process whether authentication setting of the printer is valid according to a fourth variation of the present disclosure.

FIG. 11 is a sequence diagram illustrating an exemplary port switching process including a confirmation process to determine whether an authentication setting of the printer is valid, according to a fourth variation of the present invention. FIG. 11 differs from FIG. 4, at first, in that in step S607 corresponding to step S207, the driver information acquisition unit 13 acquires information regarding whether the authentication function is enabled in addition to confirming the PnP and the brand name. Furthermore, in step S611, the port switching determination unit confirms whether the authentication function of the identified driver is enabled. The other processes are the same as in the previous embodiment.

The way of setting depends on the driver, but since the document Property or Device property is used, the authentication setting of a driver can be acquired by the following method.

(a) Obtain the authentication setting of a driver by Devmode.

By calling DocumentProperties( )of Windows API, the PC 10 can acquire the current setting in a structure called Devmode.

(b) Obtain the authentication setting of a driver by PrintTicket.

By using API(PTGetPrintCapabilitiesConvertDevModeToPrintTicketThunk2) of PrintTicket, the PC 10 can acquire the current setting in a XML format of Print Ticket and Print Capability.

(c) Obtain the authentication setting of a driver by registry.

Since the setting values of each driver is stored in HKLM/SYSTEM/CurrentControlSet/Control/Print/Printers/<icon name>/PrinterDriverData of registry, the PC 10 can acquire the setting values.

When acquiring the authentication setting by PrintTicket, it is possible to acquire the authentication setting by an XML format. However, when the format of the authentication setting is not XML, the PC 10 needs to recognize the other format. Therefore, it is preferable to obtain using PrintTicket.

In addition, the port switching determination unit 14 acquires the authentication setting of a driver. If the authentication setting is enabled, the port switching determination unit 14 switches a port based on the information 1201 shown in FIG. 12. In other words, when the authentication setting of the printer 20 is enabled (ON) and the authentication setting of a driver is not enabled (OFF), the determination unit 14 determines that the port switching process should not be performed. For other combinations, the determination unit 14 determines that the port switching process should be performed.

(Fifth Variation)

Figure 13:
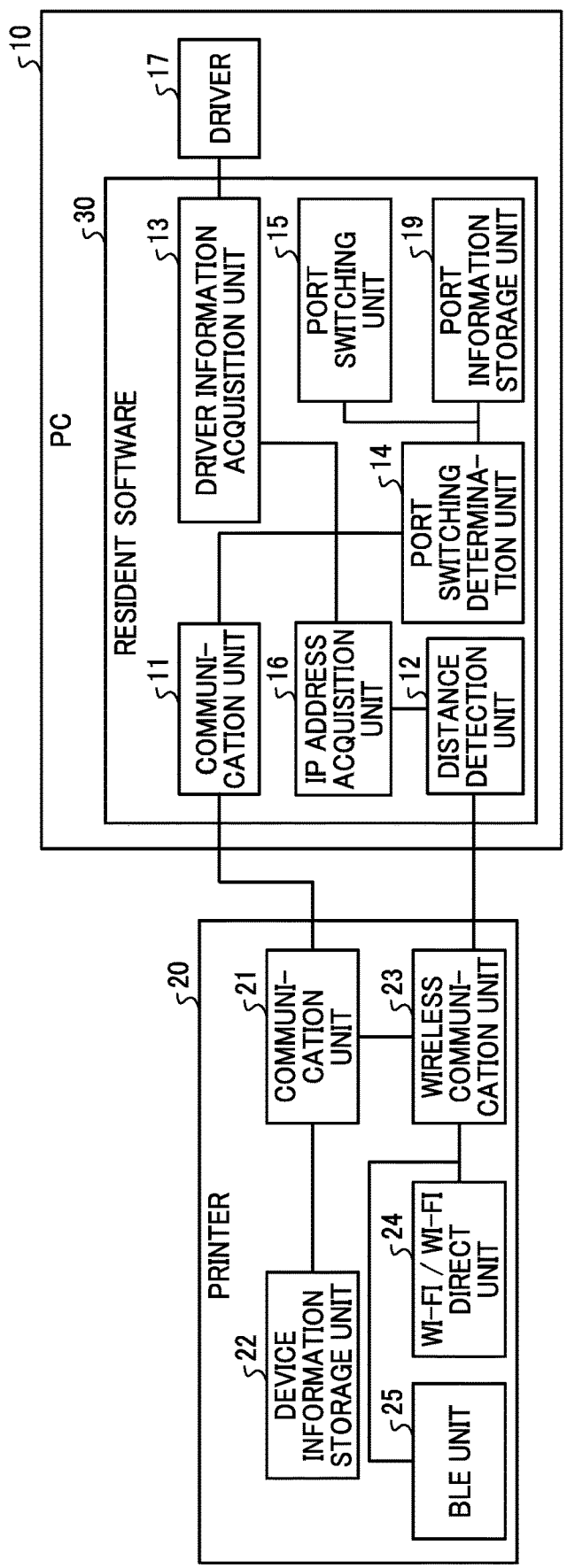
FIG. 13 is a brock diagram an exemplary functional configuration of the information processing system according to a fifth variation of the present disclosure.

In the fifth variation, when the user leaves the printer 20, the PC 10 performs a process that returns an output destination. Therefore, in the fifth variation, as illustrated in FIG. 13, a port information storage unit 19 is added to the PC 10 of the FIG. 2. The port information storage unit 19 stores the port of an icon before the port is switched.

Figure 14:
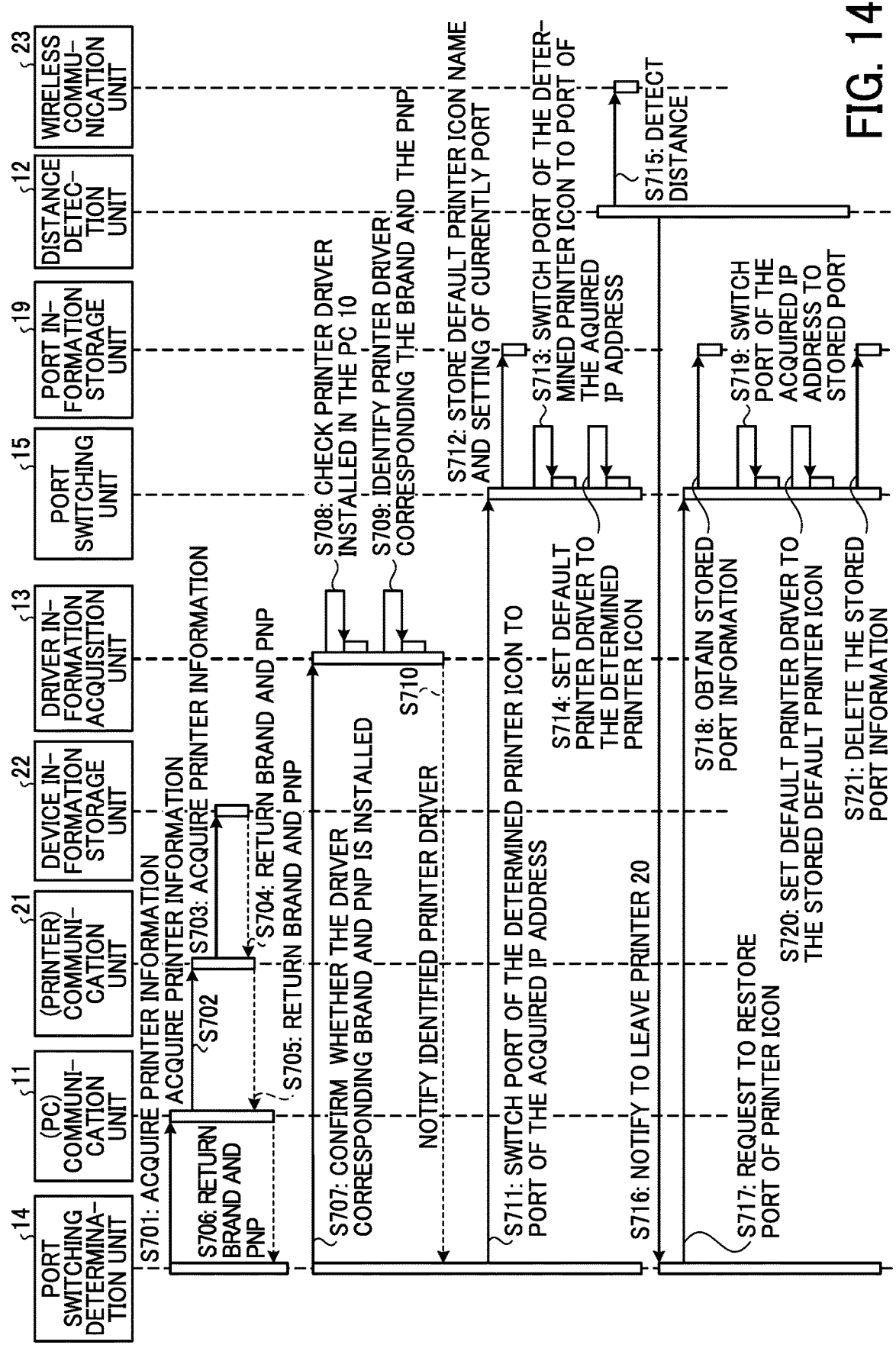
FIG. 14 is a sequence diagram illustrating an exemplary port switching process after acquiring the IP address of the printer according to a fifth variation of the present disclosure.

FIG. 14 is a sequence diagram illustrating an exemplary port switching process after acquiring the IP address of the printer according to a fifth variation of the present disclosure. In the sequence of FIG. 14, the port information storage unit 19 stores "default printer icon name" and "driver icon name" in association with "port name" (S712) as a port information before the port is switched.

Since the port of the driver corresponding to a default printer icon is changed when the PC 10 approaches the printer 20, the port information storage unit 19 needs to store the information before changing in order to restore a previous port when the PC 10 leaves the printer 20.

For example, the port information storage unit 10 stores the following information:

Default printer icon name: MP X9000
Port changed icon name: MPC 100
Port name: IP_100.200.100.200

Thereafter, when the PC 10 leaves the area of the printer 20, the distance detection unit 12 receives BLE information emitted by using BluetoothLEAdvertisementWatcher of Windows, and detects the distance between the printer 20 and the PC 10 based on the length (RSSI) of radio waves emitted from the printer 20 (S715). The port switching determination unit 14 receives a notification that indicates the PC 10 leaves the area of the printer 20 (S716), and requests the port switching unit 15 to restore the port based on the information stored by the port information storage unit 19 (S717).

The port switching unit 15 acquires the port information stored by the port information storage unit 19 (S718), and restores the port (S719). Furthermore, the port switching unit 15 restores the default printer (S720). Finally, the port information stored by the port information storage unit 19 is deleted (S721).

Figure 15:
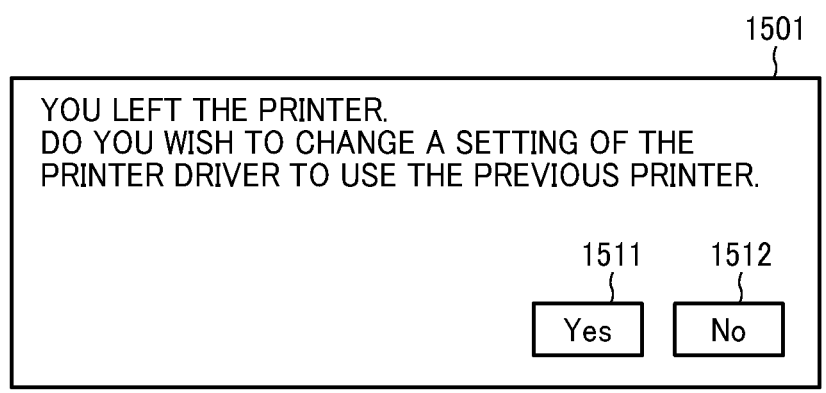
FIG. 15 illustrates an exemplary graphical user interface screen for confirming with a user before restoring the setting of port and a default printer icon according to an embodiment of the present disclosure.

As illustrated in the GUI of FIG. 15, the display unit 18 can display a screen for confirming whether to restore the setting of the default printer icon before restoring the setting of the default printer icon. The port switching unit 15 also can restore the setting only when the PC 10 receives an input indicating "Yes".

On the GUI screen in FIG. 15, a guidance screen indicating "You left the printer. Do you wish to change a setting of the printer driver to use the previous printer?" is displayed. When the PC 10 receives an input indicating "Yes", the port switching unit 15 restores the setting. When the PC 10 receives an input indicating "No", the current port setting is maintained.

The present disclosure is not limited to the above described embodiments and variations, but the components can be modified. In addition, a combination of elements of the embodiments and the variations can form different inventions. For example, some constituent elements can be deleted from all the constituent elements illustrated in the embodiments and the variations. Any one of the above-described operations can be performed in other ways, for example, in an order different from the order described above.

The software (program) executed by the PC 10 according to the disclosed embodiments and the variations can be provided by a file in an installable format or an executable format that is stored on a CD-ROM, a flexible disk (FD), or a CD-R, DVD (Digital Versatile Disk). Furthermore, the file can be provided via a network such as the Internet. The software (program) also can be provided by being incorporated in a ROM in advance.

Each of the functions of the described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus, comprising:
   processing circuitry; and
   a memory,
   wherein the processing circuitry is configured to
      obtain device information from a printer;
      obtain logical printer information regarding a logical printer, the logical printer being for printing to the printer from the information processing apparatus;
      determine whether to switch a print output destination of the logical printer based on the obtained device information and a compatible model of a printer driver corresponding to the logical printer, the compatible model of printer driver being obtained based on the obtained logical printer information;
      when determining to switch the print output destination corresponding to the logical printer, store, in the memory, the output destination of the logical printer, and switch the print output destination of the logical printer to the printer; and
      in response to detecting that the information processing apparatus leaves an area of the printer, restore a particular output destination of the logical printer to the stored output destination, after switching the print output destination of the logical printer to the particular print output destination.

2. The information processing apparatus of claim 1, wherein the processing circuitry is further configured to obtain connection information of the printer based on the device information, which is emitted from the printer.

3. The information processing apparatus of claim 2, wherein the processing circuitry is further configured to analyze a result of access of the printer by the information processing apparatus, based on specific information sent to the printer by the information processing apparatus; and
   obtain the connection information based on the analyzed result of the access.

4. The information processing apparatus of claim 1, wherein the processing circuitry is further configured to
   obtain connection information from the printer by a short-range wireless connection; and
   obtain the device information by using the obtained connection information.

5. The information processing apparatus of claim 1, wherein processing circuitry is further configured to
   obtain connection information of the printer from the printer; and
   when determining to switch the print output destination corresponding to the logical printer, switch the print output destination of the logical printer to the printer corresponding to the obtained connection information.

6. The information processing apparatus of claim 1, wherein the processing circuitry is further configured to obtain, from the printer, connection information sent by a communication protocol different from a TCP/IP protocol.

7. The information processing apparatus of claim 1, wherein the processing circuitry is further configured to determine whether to switch the print output destination of the logical printer based on comparing particular device information obtained from an INF file of the printer driver and the device information obtained from the printer.

8. The information processing apparatus of claim 1, wherein the processing circuitry is further configured to determine whether to switch the print output destination of the logical printer based on comparing particular device information obtained from setting information of the printer driver and the device information obtained from the printer.

9. The information processing apparatus of claim 1, wherein processing circuitry is further configured to display a screen for confirming whether to switch the output destination, when determining that the print output destination corresponding to the logical printer should be switched.

10. The information processing apparatus of claim 1, wherein the processing circuitry is further configured to monitor a distance between the printer and the information processing apparatus.

11. The information processing apparatus of claim 1, wherein the processing circuitry is further configured to, when a verification setting of the printer is enabled and device information associated with the printer driver stored in the memory matches the device information obtained from the printer, determine whether to switch the print output destination of the logical printer to the printer, based on whether the verification setting of the printer driver is enabled.

12. The information processing apparatus of claim 1, wherein the processing circuitry is further configured to measure a length of radio waves emitted from the printer.

13. The information processing apparatus of claim 1, wherein the processing circuitry is further configured to, when the print output destination of the logical printer is switched to the printer, set a default logical printer to the logical printer switched to the print output destination.

14. A non-transitory computer-readable storage medium storing a print control program that, when executed by an information processing apparatus, causes processing circuitry of the information processing apparatus to perform a method comprising:

obtaining device information from a printer;

obtaining logical printer information regarding a logical printer, the logical printer being for printing to the printer from the information processing apparatus;

determining whether to switch a print output destination of the logical printer based on the obtained device information and a compatible model of a printer driver corresponding to the logical printer, the compatible model of printer driver being obtained based on the obtained logical printer information;

when determining to switch the print output destination corresponding to the logical printer, storing, in a memory, the output destination of the logical printer, and switching the print output destination of the logical printer to the printer; and in response to detecting that the information processing apparatus leaves an area of the printer, restoring a particular output destination of the logical printer to the stored output destination, after switching the print output destination of the logical printer to the particular print output destination.

15. An information processing method performed by an information processing apparatus, the method comprising:

obtaining device information from a printer;

obtaining logical printer information regarding a logical printer, the logical printer being for printing to the printer from the information processing apparatus;

determining whether to switch a print output destination of the logical printer based on the obtained device information and a compatible model of a printer driver corresponding to the logical printer, the compatible model of printer driver being obtained based on the obtained logical printer information;

when determining to switch the print output destination corresponding to the logical printer, storing, in a memory, the output destination of the logical printer, and switching the print output destination of the logical printer to the printer; and in response to detecting that the information processing apparatus leaves an area of the printer, restoring a particular output destination of the logical printer to the stored output destination, after switching the print output destination of the logical printer to the particular print output destination.

* * * * *